United States Patent [19]

Tatton et al.

[11] Patent Number: 4,501,447
[45] Date of Patent: Feb. 26, 1985

[54] HAULAGE DRIVE

[75] Inventors: James P. Tatton, Carluke; James Brownlie, Overtown, both of Scotland

[73] Assignee: Anderson Strathclyde PLC, Glasgow, Scotland

[21] Appl. No.: 349,965

[22] Filed: Feb. 18, 1982

[30] Foreign Application Priority Data

Feb. 19, 1981 [GB] United Kingdom ............... 8105188

[51] Int. Cl.³ .................... E21C 35/20; F16G 13/07
[52] U.S. Cl. ......................................... 299/43; 59/85; 474/235
[58] Field of Search ............. 299/43, 34, 42; 59/78, 59/90, 80, 85; 474/232, 235, 236

[56] References Cited

U.S. PATENT DOCUMENTS

| | | | |
|---|---|---|---|
| 1,555,577 | 9/1925 | Horner | 59/78 |
| 2,249,720 | 4/1941 | Ernst | 59/35 |
| 2,785,578 | 3/1957 | Nold | 59/85 X |
| 2,787,166 | 4/1957 | Wurzel | 59/85 |
| 3,123,411 | 3/1964 | Ellison | 474/235 |
| 3,415,136 | 12/1968 | Mojonnier | 74/249 |
| 3,431,024 | 3/1969 | Braun et al. | 299/34 |
| 3,986,602 | 10/1976 | Dretzke | 59/85 X |
| 4,159,849 | 7/1979 | Rehbein | 299/34 |

FOREIGN PATENT DOCUMENTS

| | | | |
|---|---|---|---|
| 0030705 | 6/1981 | European Pat. Off. | 59/80 |
| 25425 | 5/1883 | Fed. Rep. of Germany | |
| 1137609 | 10/1962 | Fed. Rep. of Germany | 59/78 |
| 1183014 | 12/1964 | Fed. Rep. of Germany | |
| 1200405 | 12/1959 | France | |
| 2286768 | 4/1976 | France | |
| 347664 | 7/1960 | Switzerland | 59/78 |
| 1144735 | 3/1969 | United Kingdom | |
| 2018571 | 10/1979 | United Kingdom | 59/85 |

Primary Examiner—Stephen J. Novosad
Assistant Examiner—Beverly E. Hjorth
Attorney, Agent, or Firm—Mason, Fenwick & Lawrence

[57] ABSTRACT

A link component is adapted for interfitment with like link components to form a flexible chain free of hinge pins and cooperable with a drive sprocket. The link component has complementarily-shaped end parts (10, 11; 10' 11') whereof each is the true or inverted image of the other. Each end part comprises a transverse recess (20) located between transverse walls (21, 22) of which the longitudinally outer wall (22) is shorter than the inner wall (21). The shorter end of the outer wall (22) and the recess (20) have complementary rounded formations so that when the end part of one link (10 or 10') interengages with the end part (11 or 11') of an adjacent link, the respective outer walls (22) locate in the corresponding recess (20). Parallel side braces (12, 12') space the end parts (10, 11; 10' 11') apart through integration therewith and have external surfaces spaced laterally beyond the width of the end parts.

A scraper-chain conveyor comprises conveyor line pans (26) and a mining machine movable therealong, said pans having elongate channel sections (13) in which a haulage linkage is located for engagement by drive sprocket means (35) on the machine, said haulage linkage comprising a plurality of link components as above defined, each component interfitting with adjacent components and being held captive in the channel section by flanges (14) of the channel section which overhang the spaced parallel side braces (12, 12') of the link components.

5 Claims, 6 Drawing Figures

HAULAGE DRIVE

The invention relates to a haulage drive chain for co-operating with the drive element of a mining machine to generate travel longitudinally along a mine working face, and to a link for use in forming said chain.

It is known to mount mining machines, such as a machine with a cutter drum, on the frame of a chain scraper conveyor which is laid along the mine working face and to provide guide means thereon for the travel of the machine along this face.

It is also known to incorporate on the conveyor frame means for accepting either a continuous round link chain or a rack assembly with which the drive sprocket of the machine co-operates to generate travel of the machine along the mine working face.

These means usually require that a round link chain or rack element be slideably secured within fixed limits to the conveyor in a manner such that the correct pitched engagement of the machine drive sprocket therewith is assured whilst accommodating the undulations of the floor and the advance or resetting movements of the conveyor. Invariably this necessitates trapping the round link chain in hollow profile sections secured to each conveyor pan, or, in the case of rack elements, to secure them by bolting to each conveyor pan in such a manner as to minimise horizontal and vertical deflections and pitch errors.

It is the object of the invention to produce an individual chain link which by virtue of its design will eliminate the need for a continuous non-separable haulage chain stretched along the conveyor.

In accordance with one aspect of the present invention, we provide a link component adapted for interfitment with like link components to form a flexible chain free of hinge pins and cooperable with a drive sprocket, said link component having complementarily-shaped end parts whereof each is the true or inverted image of the other, each end part comprising a transverse recess located between transverse walls of which the longitudinally outer wall is shorter than the inner wall, the shorter end of said outer wall and said recess having complementary rounded formations so that when the end part of one link interengages with the end part of an adjacent link, the respective outer walls locate in the corresponding recess, and parallel side braces spacing said end parts apart through integration therewith and having external surfaces spaced laterally beyond the width of the end parts.

According to another aspect of the present invention there is provided a scraper-chain conveyor comprising conveyor line pans and a mining machine movable therealong, said pans having elongate channel sections in which a haulage linkage is located for engagement by drive sprocket means on the machine, said haulage linkage comprising a plurality of link components as defined in the preceding paragraph, each component interfitting with adjacent components and being held captive in the channel section by flanges of the channel section which overhang the spaced parallel side braces of the link components.

Embodiments of the present invention will now be described, by way of example, with reference to the accompanying drawings, in which.

Figure 1:
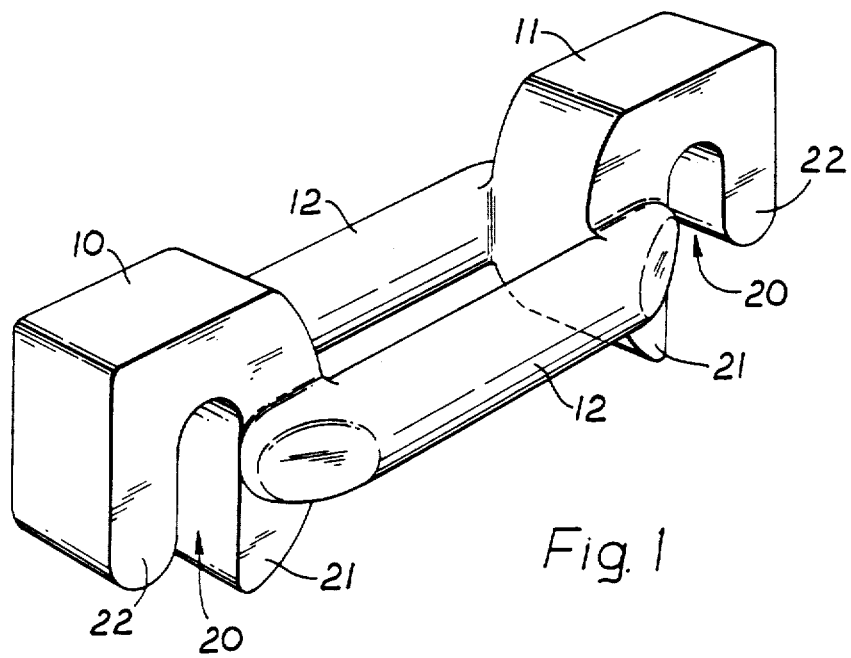
FIG. 1 is a perspective view of a link according to one embodiment of the present invention.
Figure 3:
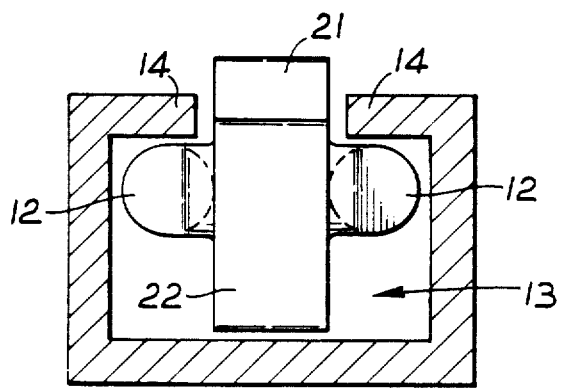
FIG. 3 is an end view illustrating the link in a guide channel of a line pan conveyor, the guide channel being shown diagrammatically.

Referring to FIG. 1, the link comprises two end parts 10, 11 spaced apart by parallel longitudinal braces 12 integral with the end parts. The braces extend laterally beyond the width of the end parts 10, 11 as shown best in FIG. 3, so that when a series of links is located in a channel 13 the braces will hold them captive therein, below overlying flanges 14.

The end parts 10,11 have a complementary shape and in this embodiment the shape of one end part 10 is the true image of the other 11.

Each end part 10, 11 has a transverse recess 20 defined between two transverse walls 21, 22 of which the longitudinally outer wall 22 is shorter than the inner wall 21. The shorter wall 22 and the recess 20 are rounded so that when the adjacent ends of adjacent links interengage (as in FIG. 2) the outer wall 22 of each end part locates in the corresponding recess 20 in the other end part.

Figure 2:
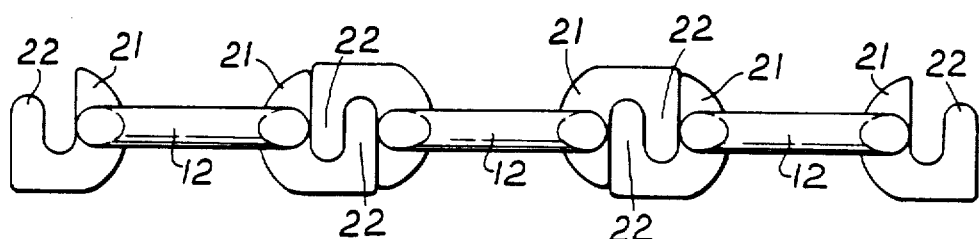
FIG. 2 is a side elevation illustrating interfitting links in accordance with FIG. 1.

In this embodiment, the links interengage by inverting the central link of three as shown in FIG. 2.

The links are placed in the channel 13 in the line pans and are held therein by location of the braces 12 below the overlying flanges 14. Parts of these flanges are movable or removable to permit introduction of the links one by one into the channel after which each link is slid longitudinally and another link inserted. There may be a plurality of places along the length of the channel where links can be so introduced. Of course, if a link is damaged it can be replaced by lifting out the link from the nearest entry position, drawing successive links into that space and removing them until the faulty link has been removed and replaced, and returning the other links until the chain is complete again. If necessary a damaged link can be transferred to the end of the chain where it is used simply as a filler.

Figure 4:
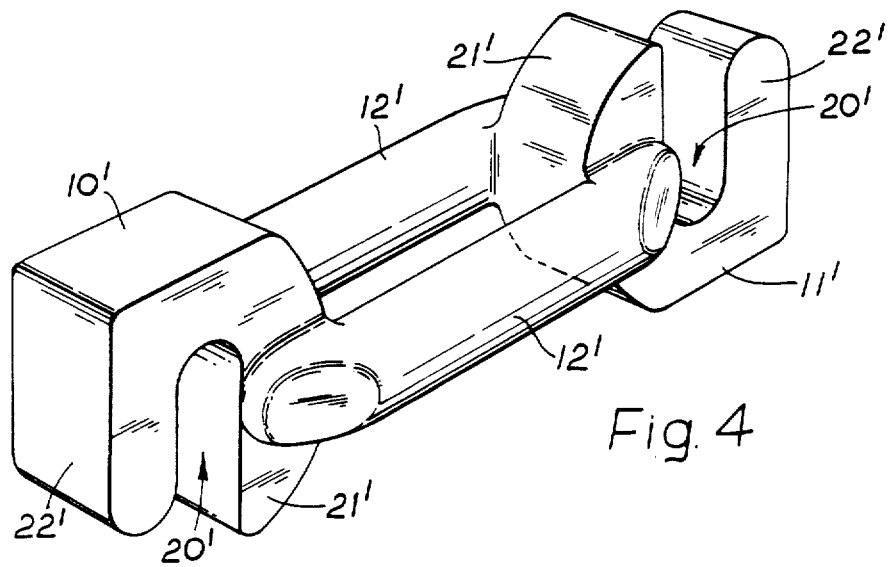
FIG. 4 is a view corresponding to FIG. 1 of a link according to a second embodiment.
Figure 5:
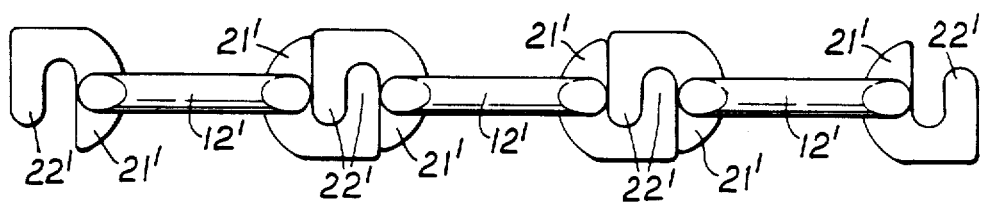
FIG. 5 is a view corresponding to FIG. 2, but with the interfitting links in accordance with FIG. 4.

In a second embodiment, FIGS. 4 and 5, the link is substantially the same as previously described and like parts are given like numbers primed. In this embodiment the end pieces 10', 11' are inverted images of each other, so that the recess 20' in the end part 10' opens downwards while recess 20' in the other end part 11' opens downwards.

Figure 6:
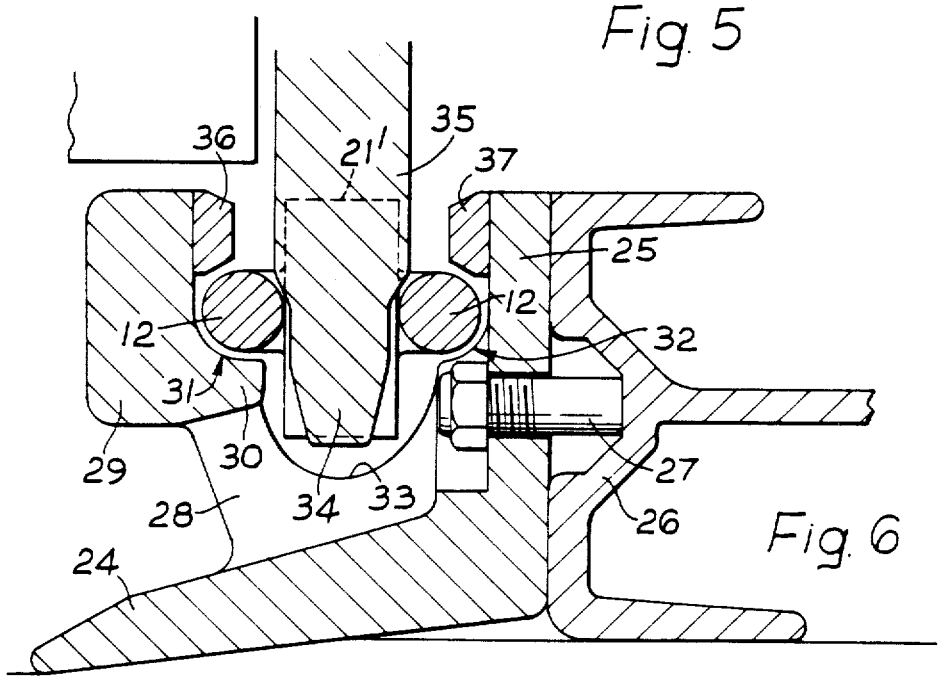
FIG. 6 is a transverse sectional view through the guide channel.

Armoured face conveyor pans are fitted with ramp plates to assist in cleaning the machine track and thus reduce the force necessary to advance the conveyor. Referring now to FIG. 6, a loading ramp plate 24 is secured through its upright flange 25 to each of the pans 26 of a flexible armoured conveyor by securing means 27. A bar 29 is supported from the ramp plate 24 in spaced and parallel relation to the flange 25 by means of parallel shaped web plates 28. The width of the space between the bar 29 and the flange 25 is a little greater than the width of the links of the haulage linkage, the bar 29 having at its lower part an inwardly-directed flange 30 through which it is integrated with the web plates 28 and which is radiused at its upper side to provide a smooth longitudinal guideway 31 for the braces 12 at one side of the series of links of the haulage chain. A similar smooth longitudinal guideway 32 for the braces 12 at the other side of the series of links is formed on the inner side of the flange 25 directly opposite the guideway 31, and the web plates have concave upper edges 33 to afford clearance for the teeth 34 of the machine drive sprocket 35 engaging the haulage chain.

The braces 12 of the chain links are trapped in position by longitudinal strips 36 and 37 removeably secured to the inner faces of the bar 29 and the flange 25, respectively, to overhang the braces 12, the inner corners of the strips 36 and 37 being chamfered.

Advantages of a loose link haulage drive chain are that the individual chain links as hereinbefore described 1. eliminate the need for continuous non separable haulage chain stretched along the conveyor,
2. eliminate the necessity to locate links individually to limit pitch errors,
3. incorporate shape and allowances on the link profile as are necessary to permit free movement in any plane to accommodate complete articulation of conveyor pans up to their designed limit of movement,
4. permit easy replacement of individual links,
5. are under compressive load at all times when acted upon by the machine drive sprocket,
6. provide automatic pitch adjustment by being free to move into correct pitch position when acted upon by the machine drive sprocket,
7. are reversible in both horizontal and vertical planes,
8. are capable of attachment and use in both vertical and horizontal attitudes,
9. permit single or multiple drive sprockets on the same axis to be used,
10. are unaffected in performance by the number of drive sprockets on the machine which may co-operate with it,
11. are suitable for either goaf or face side application,
12. provide easy evacuation of fines and other debris, and
13. transmit main axial loads to the ends of the conveyor instead of to each conveyor pan section in turn.

We claim:

1. A flexible chain free of hinger pins comprised of a plurality of link components adapted for interfitment with each other, each of said link components having complementary-shaped end parts of which each is the image of the other, each end part comprising a transverse recess which is open at one end, closed at the other end by a curved face and bounded by two parallel straight sides between an inner wall and an outer wall longitudinally disposed of each other, said outer wall is shorter than the inner wall, said outer wall having a straight end face parallel with the sides of the recess and an opposed end of a rounded configuration complementary so that when said end part of a first link component interengages with said end part of a second link component, said respective outer walls locate in said corresponding recesses, and parallel side braces extending between the inner walls of the end parts and spacing said end parts apart through integration therewith and having external surfaces spaced laterally beyond the width of said end parts.

2. The flexible chain as claimed in claim 1, wherein there is further comprised conveyor line pans and a mining machine movable therealong, each of said pans having elongate channel sections for receiving said flexible chain, said mining machine including drive sprocket means for drivingly engaging said flexible chain, each of said first and second link components interfitting each other, said channel sections comprising flanges which overhang said spaced parallel side braces of said first and second link components for retaining therein said flexible chain.

3. A flexible chain as defined in claim 1, wherein the end parts of each link are a true image of each other.

4. A flexible chain as defined in claim 3, wherein each alternate link is inverted relative to the adjacent two links.

5. A flexible chain as defined in claim 1, wherein one of the end parts of each link is an inverted image relative to the other end part.

* * * * *